United States Patent [19]

Pinto

[11] Patent Number: 4,689,208

[45] Date of Patent: Aug. 25, 1987

[54] AMMONIA SYNTHESIS

[75] Inventor: Alwyn Pinto, Middlesbrough, England

[73] Assignee: Imperial Chemical Industries PLC, London, England

[21] Appl. No.: 908,873

[22] Filed: Sep. 15, 1986

Related U.S. Application Data

[63] Continuation of Ser. No. 721,181, Apr. 8, 1985, abandoned.

[30] Foreign Application Priority Data

Apr. 25, 1984 [GB] United Kingdom ............... 8410517

[51] Int. Cl.$^4$ ........................ C01C 1/04; C01C 1/12
[52] U.S. Cl. .................................. 423/362; 423/359; 423/237; 55/23; 55/25; 55/27; 55/40; 55/49; 55/70
[58] Field of Search .............. 423/352, 359, 362, 237; 55/23, 27, 70, 40, 48, 49, 25

[56] References Cited

U.S. PATENT DOCUMENTS

| | | | |
|---|---|---|---|
| 3,743,699 | 7/1973 | Bogart | 423/359 |
| 4,107,277 | 8/1978 | de Rosa | 423/362 |
| 4,149,857 | 4/1979 | Volke et al. | 55/70 |
| 4,153,673 | 5/1979 | Becker | 423/362 |
| 4,255,406 | 3/1981 | Isalski et al. | 55/27 |
| 4,271,136 | 6/1981 | Tennison | 423/362 |
| 4,298,588 | 11/1981 | Pinto | 423/362 |
| 4,320,100 | 3/1982 | Engelbrecht et al. | 423/362 |
| 4,441,895 | 4/1984 | Silberring | 55/70 |

FOREIGN PATENT DOCUMENTS 00272929  5/1928  United Kingdom ................. 55/70

OTHER PUBLICATIONS

"Best Pressure for NH$_3$ Plants, Petrochemicals Developments, Nov. 1968, vol. 47, No. 11.
Acaricide—Antihistaminica, Ullmanns Encyklopadie der Technischen Chemie, Verlag Chemie, Weinheim/-Bergstr.

*Primary Examiner*—Andrew H. Metz
*Assistant Examiner*—Anthony McFarlane
*Attorney, Agent, or Firm*—Cushman, Darby & Cushman

[57] ABSTRACT

In an ammonia synthesis process a nitrogen-hydrogen gas is reacted partially over a catalyst at a pressure in the range 30–120 bar abs, ammonia is separated as liquid after cooling the reacted synthesis gas and unreacted synthesis gas is recycled. The liquid ammonia is evaporated in heat exchange with reacted synthesis gas to provide the required cooling effect. Such heat exchange is effected using a heat exchange surface (as in a plate-fin heat exchanger) of at least 1.5 m$^2$ per kg mol per hour of ammonia to be condensed, with cold-end temperature approach of less than 8° C. and a hot-end temperature approach of less than 5° C. whereby exploit the heat effect of, inter alia, the non-ideality of ammonia to provide product gaseous ammonia at a convenient pressure with minimal mechanical refrigeration.

8 Claims, 3 Drawing Figures

AMMONIA SYNTHESIS

This is a continuation of application Ser. No. 721,181, filed Apr. 8, 1985, abandoned.

This invention relates to an ammonia synthesis process and plant characterised by the means by which ammonia is recovered from reacted synthesis gas and also by the means for recovering the exothermic heat of the synthesis reaction.

Although in the interest of energy economy it is desirable to synthesise ammonia at relatively low pressures, for example under 140 bar abs., such as economy cannot be fully realised because the lower the pressure, the lower the temperature to which reacted synthesis gas must be cooled in order to separate ammonia by liquefaction and consequently there must be greater energy consumption in refrigeration. In the first decade of industrial ammonia synthesis it appears to have been common practice to separate ammonia by absorption in water but this entails expense in drying recycled unreacted synthesis gas leaving the absorber and energy consumption in recovering anhydrous ammonia from aqueous solution. In that early period it was also proposed to use the liquid ammonia separated by simple cooling as the source of cold for condensing ammonia from reacted synthesis gas, and thus to deliver the product ammonia in gaseous form. As an optimised development of such a process it was proposed in GB-A-No. 272929, to recover gaseous ammonia by cooling the reacted synthesis gas to minus 60° to 70° C. (so that almost no ammonia remains in the unreacted gas recycled to the synthesis reactor), separating liquid ammonia, evaporating under low pressure that liquid ammonia and leading it to meet the reacted synthesis gas in counter-current heat exchange; if desired, new quantities of ammonia were to be added to the reacted synthesis gas to increase the cooling effect. In such a process, however, a considerable part of the product is recovered by condensation in heat exchange with cooling water and, even though the use of a closed refrigeration circuit is unnecessary, pumping machinery cannot be avoided. Thus, a vacuum pump is used to maintain the reduced pressure under which the liquid ammonia is evaporated and a compressor may be needed to bring the vacuum pump exhaust ammonia gas to a pressure convenient to the user. Further, when the said new quantities of ammonia are added to the reacted synthesis gas to increase the cooling effect, the vacuum pump exhaust ammonia gas has to be compressed to reacted synthesis gas pressure: then, indeed, a refrigeration circuit (though not a closed one) is present.

Since the early years of industrial ammonia synthesis the cold content of product liquid ammonia has been utilised in minor ways but not as a main source of refrigeration in substantial balance with condensation of ammonia from reacted synthesis gas. In view of the recent trend towards synthesis at lower pressures, especially under 120 bar abs. such that little if any product ammonia can be condensed in exchange with cooling water, it would be expected that the prospect of avoiding expensive refrigeration machinery for a condensation/evaporation ammonia recovery system had receded still further.

We have now realised that whereas such lower synthesis pressures make ammonia condensation more difficult, they also open the way to the use of heat exchangers of a much more efficient type than could be used previously, so much so that substantially all the available cold, corresponding not only to ordinary sensible heat and latent heat of evaporation but also to minor heat effects due to pressure let-down of ammonia as a non-ideal gas, can be brought into use to provide a system close to thermal balance.

According to the invention a process for producing ammonia comprises (a) reacting a nitrogen-hydrogen ammonia synthesis gas over an ammonia synthesis catalyst in conditions effecting partial conversion to ammonia;

(b) cooling the reacted synthesis gas to below the dewpoint of ammonia by indirect heat exchange with colder fluids including, in decreasing order of temperature, unreacted feed synthesis gas, ambient air or water, and refrigerant;

(c) separating liquid ammonia from the cooled gas and recycling unreacted gas to stage (a);

(d) evaporating at least part of the separated liquid ammonia as refrigerant in heat exchange with partly cooled reacted synthesis gas; and (e) delivering a gaseous ammonia product: and is characterised by (i) carrying out stages (a) to (c) at a pressure in the range 25 to 120 bar abs.;

(ii) carrying out the said indirect heat exchange in stage (b) in at least 2 phases, the first of which produces a partly cooled gas weak in or free of liquid ammonia and the last of which produces liquid ammonia and a cold unreacted gas stream containing at least 2% v/v of gaseous ammonia;

(iii) carrying out the last phase of step (ii) at an ammonia separation temperature in the range plus 25 to minus 33° C. by heat exchanging the said partly cooled gas counter-currently with the said cold unreacted gas stream, with gaseous ammonia produced by the said evaporation in stage (d) and with the said liquid ammonia undergoing evaporation, and delivering a gaseous ammonia product at a pressure of more than 1 bar abs;

(iv) affecting the heat exchanges in stage (iii) with a heat exchange surface of at least 1.5 m$^2$ per kg mol per hour of ammonia to be condensed from reacted synthesis gas, with a cold end temperature approach of less than 8° C. and with a hot-end temperature approach of less than 5° C., whereby to transfer to the said partly cooled reacted synthesis gas the cold corresponding to the sensible heat of the said cold unreacted gas stream and gaseous ammonia, the latent heat of evaporation of the said liquid ammonia and the heat effect of pressure let-down of ammonia as a non-ideal gas.

By "cold-end temperature approach" is meant the difference in temperature between the cooled reacted synthesis gas leaving the heat exchange and the evaporating liquid ammonia about to enter the heat exchange. Likewise "hot-end temperature approach" is the difference in temperature between the partly cooled reacted synthesis gas about to enter the heat exchange and the ammonia vapour leaving it. Since the relevant heat exchangers are all counter-current, the pairs of streams whose temperatures are to be compared are all at the same end of the heat exchanger body. In normal operation, whereas liquid ammonia may enter the cold end of a heat exchanger, it evaporates as the result of heat exchange and only vapour leaves the hot end. The specified cold-end temperature approach applies to the last heat exchange before ammonia separation if more than one step of heat exchange is used. The specified hot-end temperature approach applies to the first heat exchange of reacted synthesis gas with the cold unreacted gas stream or gaseous ammonia produced by evaporation or evaporating liquid ammonia. Equally close temperature approaches are preferably obtained at intermediate levels of heat exchange.

The quoted heat exchange surface is that contacted by the reacted synthesis gas but not that contacted by the other fluids taking part in the heat exchange.

The extent to which the heat effect of pressure letdown is greater for the non-ideal gas ammonia than it would be for an ideal gas can be gauged from Table I showing the heat of formation of ammonia at 25° C. from nitrogen and hydrogen at various pressures.

TABLE 1

| Pressure. bar abs. | Enthalpy of formation J k mol$^{-1}$ × 10$^{-7}$ |
| --- | --- |
| 10 | −4.6488 |
| 9 | −4.6423 |
| 8 | −4.6359 |
| 7 | −4.6297 |
| 6 | −4.6235 |
| 5 | −4.6175 |
| 4 | −4.6116 |
| 3 | −4.6057 |
| 2 | −4.6000 |
| 1 | −4.5943 |

As a result of the difference in heat of formation, expansion of ammonia from 10 to 1 bar abs. produces a temperature drop of about 1.7° C. This would be almost impossible to utilise when using conventional heat exchanger, but is exploited in the process of the invention. It is additional to the temperature drop that can be obtained by expanding gases with performance of work and, indeed, makes the process operable without performance of work.

In stage (i) the pressure is preferably in the range 60 to 100 bar abs. if an iron synthesis catalyst is used or 25 to 60 bar abs. if a ruthenium catalyst is used. The broad and preferred pressure range are typical of the new generation of low-energy ammonia processes such as described in our U.S. Pat. Nos. 4,298,588 and 4,383,982. At such low pressures it is not practicable to condense significant quantities—at most 5% of the quantity present—of ammonia from reacted synthesis gas by heat exchange with cooling air or water, but this is of no consequence as a result of the efficient heat exchange in the last phase of stage (ii). The reacted synthesis gas contains typically 10 to 15% v/v of ammonia before condensation of ammonia.

In stage (ii) the ammonia content of the cold unreacted gas stream is preferably in the range 4 to 8% v/v. This is higher than in conventional processes industrially operated, in which about 2% is preferred, and much higher than was proposed in GB-A-No. 272929. At the low extremes of the ranges in stage (i) of pressure and ammonia content of cold unreacted gas it may be desirable to use a small closed refrigeration circuit, as will be described.

In stage (iii) the ammonia separation temperature is preferably in the range plus 10° to minus 15° C. and the ammonia gas is delivered at a pressure in the range 2 to 7 bar abs. For greater efficiency of heat exchange the process comprises dividing the liquid ammonia into two parts, letting down the first part to a pressure of 3-10, especially 4 to 7, bar abs, letting down the second part to a pressure of 1-5, especially 2 to 4, bar abs, and heat exchanging the partly cooled reacted synthesis gas successively with evaporating liquid ammonia of the said first and second parts, whereby to cool the said gas to successively lower temperatures corresponding to the pressures at which evaporation takes place. The ammonia gas resulting from evaporation is preferably heat exchanged further with reacted synthesis gas and finally delivered at a temperature in the range 25° to 40° C. It may if desired be let down in pressure in an engine with performance of work, to enhance its cooling effect, and such an engine is conveniently disposed between a liquid/gas heat exchanger and a gas/gas heat exchanger of the high surface type.

In stage (iv) the heat exchange surface is preferably at least 2.5 m$^2$ per kg mol per hour of ammonia to be condensed from reacted synthesis gas, the cold end temperature approach is less than 4° C. and the hot-end temperature approach is less than 3° C. The upper limit of heat exchange surface is not critical, but is typically less than 10 in the above-mentioned units to avoid excessively increased pressure drop and cost. Such heat transfer surfaces are preferably obtained using secondary surface heat exchangers as described further below. So far as is known, it has not previously been proposed to use such heat exchangers for synthesis gas cooling in an ammonia synthesis process.

As a result of the combination of process conditions and heat exchange procedure, the process can operate without external refrigeration. However, it is preferred to have a small external closed refrigeration circuit, capable of removing typically up to 10% of the latent heat of condensation of product ammonia, as an aid to starting up the process and/or to compensate for fluctuations in gas flows and/or to permit delivery of product gaseous ammonia at a higher pressure than would otherwise be possible, should an ammonia user require.

The heat exchange in stages (iii) to (iv) by means of one or more secondary-surface (especially plate-fin) heat exchangers is made practicable by operation in the specified pressure range. At present the maximum design pressure of such heat exchangers fabricated in brazed aluminum is 83 bar. Development to withstand higher pressures is to be expected and this is in any event already possible if the material of construction is stainless steel. Other types of secondary surface heat exchanger such as the finned-tube type can be used, but are less compact than the plate-fin type. Typically the heat exchangers used have an outer volume of less than 0.05 m$^3$, for example 0.02 m$^3$, per metric ton per day of ammonia output. This is less than 25% of what would be needed to afford slightly higher temperature approaches using shell-and-tube heat exchangers. The heat exchanges in step (b) are, in more detail, typically as follows:

1. with external heat recovery, by for example steam superheating, steam raising or boiler feed water heating or more than one of these. This heat recovery corresponds to the exothermic heat of the synthesis reaction;
2. synthesis gas preheating to catalyst inlet temperature;
3. synthesis gas preheating to the temperature of quench gas (if a quench reactor is used) or to tube inlet temperature (if a tube-cooled reactor is used);
4. heat rejection to ambient air or water;
5. chilling to below the dewpoint of ammonia.

Of three heat exchanges, 1 to 4 correspond to the first phase mentioned in stage (ii) above. Exchanges 1 to 3 effect no condensation of ammonia and exchange 4 effects condensation of at most one tenth, preferably less than one twentieth, of the ammonia present in the reacted synthesis gas. Exchange 5 is the last phase of stage (ii) and is carried out as described in paragraphs (iii) and (iv). Whereas exchange 5 is preferably carried out using a plate-fin heat exchanger, it is preferred to use such a heat exchanger also for exchanges 4 or 3 or both. In exchange 4 the temperatures do not normally exceed 50° C. and a brazed aluminium heat exchanger is preferred. In exchange 3 the highest temperature can be under 300° C., and then a stainless steel plate-fin heat exchanger is preferably used. The heat exchange areas are preferably as defined for exchange 5. By the use of such plate-fin heat exchangers the temperature approaches in °C. can be at the following loss levels:

| heat exchange | cold end | hot end |
| --- | --- | --- |
| 3 | under 8 | 3–20 |
| 4 | under 8 | 2–10 |

In a preferred process the external heat recovery heat exchange 1 comprises a boiler generating steam, at a pressure conveniently in the range 15–40 bar; the steam output can be sufficient, and is preferably used, to power at least one of the synthesis gas circulator, any synthesis gas compressor and such refrigeration or ammonia liquefaction machines as may be needed in start-up or coping with gas fluctuations or incomplete cold recovery, as already described. If the synthesis reactor includes an uncooled catalyst bed at its outlet, the reacted gas is preferably passed first through a steam superheater before entering the boiler. In an alternative system the synthesis reactor itself is of the steam raising type with steam coils between separated beds, in which such superheating is also possible. In a further alternative the synthesis reactor contains catalyst-filled tubes surrounded by boiling water or a single body of catalyst cooled by boiler tubes in most or all its length.

As so defined, the process has the advantage of autonomy in power supply and thus is highly suitable for operation in combination with a fresh synthesis gas generation system of the type not producing high pressure steam, for example a steam-air-hydrocarbon reformer with internal heat recovery.

The gaseous ammonia delivered in stage (iii) can be used as such, for example by conversion to ammonium nitrate or phosphate or oxidation to nitric acid or ammoxidation or feeding to a urea synthesis process accepting gaseous ammonia feed. Alternatively at least part of it can be liquefied by compression and cooling: this in general is more convenient and economic than would be the formation of an equal quantity of liquid ammonia by condensation from reacted synthesis gas.

Apart from the heat exchange features characterising the invention, the synthesis process is generally of the known type. Thus when using an iron catalyst the catalyst outlet temperature in stage (a) is typically up to 500° C., especially in the range 250–480, for example 350°–460° C., such as are preferred for synthesis at the specified low pressures on account of more favourable equilibrium.

The synthesis gas entering the catalyst preferably consists to the extent of at least 70%, especially at least 90% of the mixture $N_2 + 3H_2$.

The catalyst in stage (a) is typically metallic iron, possibly containing 1–20% of metallic cobalt, and in any event containing up to 10% of promoter oxides, especially those of potassium and aluminium and possibly also of one or more of calcium, magnesium, rare earth metals and metals of Groups IVA–VIIA of the Periodic Table. These percentages are by weight on the oxidic precursor from which the catalyst is made by reduction and in which the iron oxide is calculated as $Fe_3O_4$ and any cobalt oxide as $Co_3O_4$. Other catalysts, for example, supported noble metals such as ruthenium on a support can be used: in the latter event the synthesis is preferably of the type having catalyst in tubes surrounded by boiling water.

Corresponding to the ammonia synthesis process as herein defined the invention provides also an ammonia synthesis plant comprising the flow sequence a catalytic synthesis reactor;
a reacted synthesis gas cooling means:
  first providing external heat recovery;
  second, by heat exchange with unreacted synthesis gas;
  third, by heat rejection to air or water;
a reacted gas chilling heat exchanger effective to condense ammonia therefrom;
a liquefied ammonia separator;
a circulating pump effective to feed unreacted gas from the separator, along with fresh synthesis gas, to the synthesis reactor;
a flow connection from the separator to the cold side of the chilling heat exchanger;
a delivery line feeding ammonia gas produced by evaporation of liquid ammonia on the cold side of the chilling heat exchanger;
characterised in that
(i) the plant items containing ammonia synthesis gas are constructed to withstand a pressure in the range 30 to 120 bar abs;
(ii) the chilling heat exchanger is constructed to provide a heat exchange surface of at least 0.12 m² per kg mol per hour of gas pumping capacity of the circulating pump.

In such a plant preferably at least the chilling heat exchanger, preferably also the heat rejection heat exchanger and possibly also the feed/effluent exhchanger for heat exchange reacted and unreacted synthesis gas, are of the plate-fin type. The chilling heat exchanger and heat rejection heat exchanger, both operated at under 50° C., are preferably fabricated in brazed aluminium. The feed/effluent heat exchanger, operated at under 300° C., is preferably fabricated in stainless steel. The heat exchange surfaces are preferably in the range 0.24 to 0.96 in the units specified. Such heat exchangers are very compact as already mentioned, and thus the ammonia plant according to the invention is much more compact and lower in capital cost than conventional plants using tube-in-shell heat exchangers.

BRIEF DESCRIPTION OF THE DRAWINGS

In the accompanying drawings.

Referring to FIG. 1, fresh ammonia synthesis gas 10 containing hydrogen and nitrogen ($H_2/N_2$ at least 1.5, preferably 1.8 to 2.5 or up to 3.1) is united at 12 with a recycle stream to be described and the mixture at a pressure in the range 60-100 bar abs. is fed to the inlet of circulating pump 14 in which its pressure is increased by 5-10%. The mixed gas, heated a few degrees by compression, is heated to for example 220°-280° C. in feed/effluent heat exchanger 16 (secondary-surface type), then brought up to iron synthesis catalyst inlet temperature (typically 300°-350° C.) in the internal heat exchanger 18 of reactor 20. It enters catalyst bed 22, reacts exothermally to form ammonia and, now typically at a 40°-80° C. higher temperature, passes through the hot side of heat exchanger 18 and second catalyst bed 23, thence out to external heat recovery in boiler superheater 24. (Reactor 20 is shown, for simplicity, with two catalyst beds and one heat exchanger. In practice more than one bed is often used, heat exchanger 18 may be provided by tubes within the catalyst bed or supplemented by inter-bed quench injection of gas bypassing 18 or other inter-bed indirect heat exchanger. A further type of reactor is shown in FIG. 2).

Figure 1:
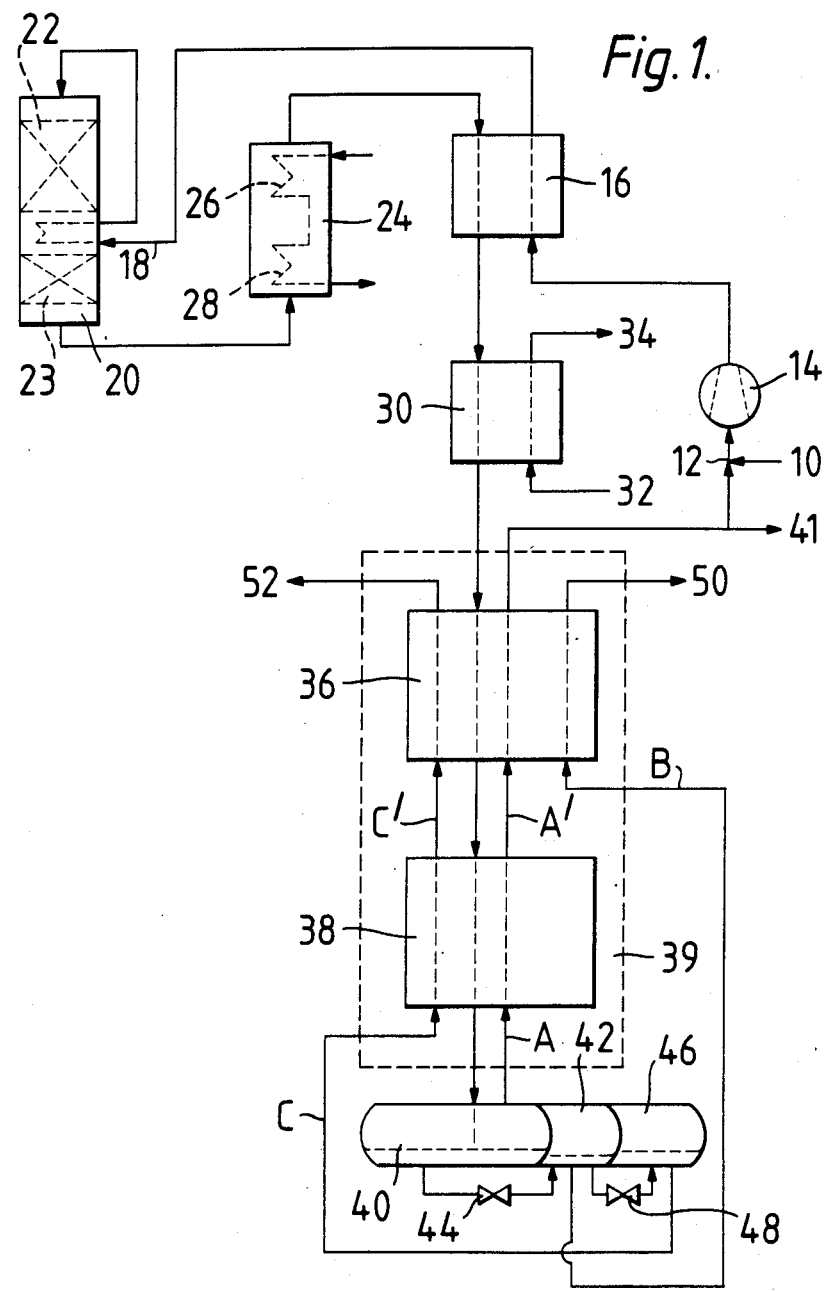
FIG. 1 is the flowsheet of an ammonia synthesis process and plant according to the invention.

In boiler/superheater 24 the reacted synthesis gas is cooled to 240°-300° C. and water is vaporised to give steam at 15-40 or up to 80 bar abs. with 50°-120° C. of superheat. The steam is fed out to a turbine (not shown) powering directly or electrically compressor 14 and other machines. In a second stage of cooling the gas is fed to feed/effluent heat exchanger 16 and is therein cooled to 30°-50° C. Exchanger 16 is of the plate-fin type fabricated in stainless steel, with a heat exchange surface in the range 0.24 to 0.96 m$^2$ per kg mol per hour of gas pumping capacity of circulating pump 14. The cold-end temperature approach in 16 under 8° C., for example 3° C.; at the same time the unreacted gas is very effectively heated, giving a hot-end temperature approach in the range 3°-20° C. In a third stage of cooling the reacted synthesis gas is cooled in brazed aluminium plate-fin heat exchanger 30 with rejection of heat to cooling water fed in at 32 and out at 34. In 30 the cold-end temperature approach is under 8° C. for example 2° C.; at the same time the hot-end temperature approach is in the range 2°-10° C. The reacted synthesis gas is still free of liquefied ammonia.

For the ammonia separation phase of cooling the gas is passed into first chiller 36 in which it gives up heat to the following cold streams:

A': partly warmed unreacted ammonia synthesis gas, preparatory to recycle;
B: intermediate pressure evaporating liquid ammonia;
C': low pressure ammonia gas.

The cold-end temperature approach is under 4° C., in fact effectively zero, and the hot-end temperature approach is under 3° C. as a result of the large heat exchange surface area (2.8 m$^2$ per kg mol h$^{-1}$ of ammonia, to be condensed) and as a result of the high thermal conductivity of aluminium. The resulting partly chilled gas is passed into second chiller 38 similar in construction to 36, in which it is heat exchanged with the following cold streams:

A: cold unreacted ammonia synthesis gas; and
C: low pressure evaporating liquid ammonia.

Chillers 36 and 38 are enclosed in insulated cold box 39. The cold-end temperature approach is zero between the gas streams and about 5° C. between partly chilled gas and evaporating liquid ammonia C. The hot-end temperature approach is effectively zero °C. The chilled gas, now containing suspended liquid ammonia, is passed into separator 40, from which cold unreacted gas stream A, containing 4-8% v/v of ammonia passes overhead. Liquid ammonia passes from 40 into first let-down vessel 42 by way of valve 44. A stream of liquid ammonia is taken off as stream B and allowed to evaporate at 4-10 bar pressure in first stage chiller 36. The remainder of the liquid ammonia entering 42 is passed into second let down vessel 46 by way of valve 48: from vessel 46 a liquid ammonia stream is allowed to evaporate at 1-4 bar pressure as stream C in second stage chiller 38. The ammonia gas resulting from evaporation of stream C can if desired be expanded in an engine with performance of work being fed to the cold side of first chiller 36. The following streams are taken from the cold side of chiller 36:

warmed A', to the inlet of compressor 14 via purge point 41 and mixing point 12;
warmed B and C', to users of gaseous ammonia or to a liquefaction plant.

The gas from purge point 41 can be treated to recover ammonia and thereafter to separate a hydrogen-enriched stream for recycle to the inlet of compressor 14 or elsewhere and a methane-containing stream which can be used as fuel.

In an alternative process stream C' can be fed direct to an ammonia user, without passing through heat exchanger 36. In this event there is a small shortfall of cold, which would be compensated for by a small mechanical refrigeration circuit (not shown). Yet another arrangements of the heat exchangers are possible; for example 3 separate heat exchangers, each having as cold fluid one of streams A, B and C could be used.

Typical temperatures in the stated ranges are shown in Table 2, in comparison (at temperatures over 33° C.) with those required when using conventional tube-in-shell heat exchangers.

TABLE 2

| | Temperature °C. | | | | | | | |
|---|---|---|---|---|---|---|---|---|
| | Invention | | | | Conventional* | | | |
| Posi- | hot side | | cold side | | hot side | | cold side | |
| tions | inlet | outlet | inlet | outlet | inlet | outlet | inlet | outlet |
| 16 | 269.5 | 45 | 42 | 255 | 287 | 52 | 32 | 255 |
| 30 | 45 | 35 | 33 | 40 | 52 | 40 | 33 | 40 |
| 36 | 35 | 4 | 4 | 33 | | | | |
| 38 | 4 | −5 | −10 | 4 | | | | |

*Since ammonia condensation by conventional heat exchangers is not practised, no data below 33% °C. can be quoted.

Typical pressures, temperatures and ammonia concentrations for the process are shown in Table 3.

TABLE 3

| Position | Stream name | Pressure bar abs. | Temperature °C. | NH$_3$ concn % v/v |
|---|---|---|---|---|
| 30 outlet | Cooled reacted synthesis gas | 77 | 35 | 13 |
| 40 inlet | Chilled reacted synthesis gas | 77 | minus 5 | 13 |
| 36 A' out | Unreacted synthesis gas | 76 | 33 | 6 |
| 36 B in | Intermediate pressure ammonia | 5 | 4 | 100 |
| 36 B out | Intermediate pressure ammonia | 5 | 33 | 100 |
| 38 C in | Low pressure ammonia | 3.1 | minus 10 | 100 |
| 36 C' out | Low pressure ammonia | 3.1 | 33 | 100 |

Figure 2:
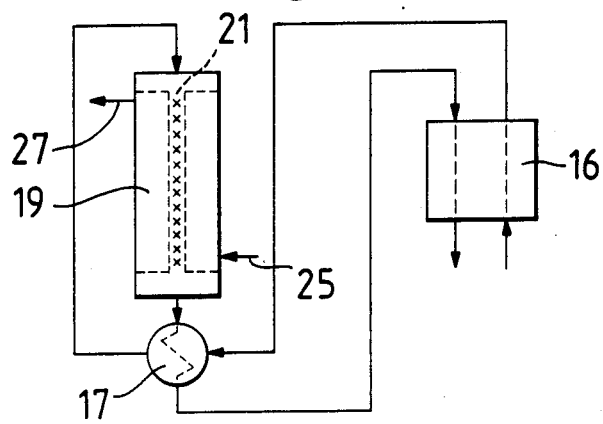
FIG. 2 represents an alternative ammonia synthesis reactor and heat exchange system usable in the process of FIG. 1.

FIG. 2 shows an alternative synthesis reactor and external heat recovery system. The mixture of fresh ammonia synthesis gas and recycle gas leaving feed/effluent heat exchanger 16 is as described with reference to FIG. 1. It is brought up to synthesis catalyst inlet temperature in high temperature feed/effluent heat exchanger 17. The gas then enters reactor 19 and reacts to synthesis ammonia over the catalyst 21 in tubes surrounded by water fed in at 25 and discharged as steam at 27. The reacted gas leaves reactor 19 at a temperature up to 50° C. above or possibly down to 25° C. less than that at which it which it entered, is passed through the hot side of exchanger 17 and into exchanger 16, which is as in the process of FIG. 1.

Apart from the synthesis temperature difference, the ruthenium catalysed process is operated typically at 30 bar abs pressure and with an ammonia separation temperature 10° C. lower than in the iron-catalysed process.

Figure 3:
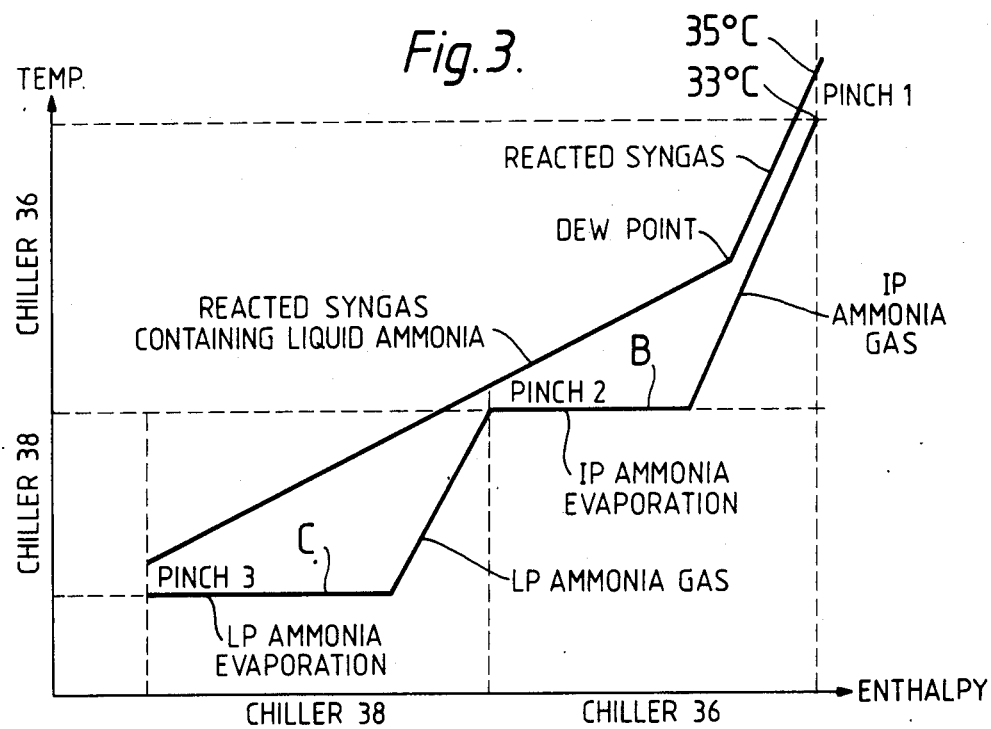
FIG. 3 is a graph of temperature against enthalpy for the reacted synthesis gas and product ammonia in such a process.

In the temperature-enthalpy diagram of FIG. 3 cooling curves are represented for heat exchangers 36 and 38:

Reacted syngas: here the enthalpy decreases slowly, since only the sensible heat of gas is decreasing. However, the slope changes once the ammonia dewpoint temperature is reached;

Reacted syngas containing liquid ammonia: here the enthalpy decreases rapidly since, in addition to loss of sensible heat, the latent heat of vaporisation of ammonia is lost as its vapour pressure decreases and liquid separates;

LP Ammonia evaporation (stream C): here ammonia vaporises in chiller 38, taking in latent heat of evaporation but without increasing its temperature;

LP ammonia gas: here the ammonia vapour in chiller 38 takes in sensible heat, its temperature rises and its enthalpy increases slowly. This line represents also the temperature of the unreacted synthesis gas separated from liquid ammonia and now being recycled:

IP ammonia evaporation (stream B): here ammonia evaporates in chiller 36, taking in latent heat of vaporisation but without increasing its temperature;

IP ammonia gas: here the ammonia vapour in chiller 36 takes in sensible heat, its temperature rises and its enthalpy increases slowly. This line represents also the temperature of the unreacted synthesis gas now being recycled;

Pinches 1, 2, 3: as the fluids proceed through the heat exchangers in counter-current, the difference in temperature between the hot-side and cold-side fluids decreases. In a conventional shell-and-tube heat exchanger it is not practicable to provide so large a heat exchange surface that a temperature approach of less than about 20° C. can be achieved, and consequently highly efficient recovery of cold does not take place: thus a "pinch" is recognised at typically a 20° C. temperature difference. Using a high surface heat exchanger, however, a pinch is recognised only at a 5° C. difference or even less and a small region of zero difference is not uneconomic. Consequently, substantially all the cold can be recovered. Indeed, the temperature difference in the region "Pinch 1" is largely due to the nonideality of ammonia, but the brazed aluminium plate-fin heat exchanger enables this to be fully exploited, with a final hot-end temperature approach as specified.

I claim:

1. In a process for producing ammonia which comprises:
(a) reacting a nitrogen-hydrogen ammonia synthesis gas stream over an ammonia synthesis catalyst at conditions effecting partial conversion to ammonia;
(b) cooling the reacted synthesis gas stream to produce a cold stream at a temperature below the dew point of ammonia by indirect heat exchange with colder fluids including
   indirect heat exchange with a stream of unreacted feed synthesis gas, followed by indirect heat exchange with air or water at ambient temperature to form a partly cooled gas stream, and further cooling said partly cooled gas stream to form the cold gas stream, by indirect heat exchange with refrigerant,;
(c) separating the cold stream into a liquid ammonia stream and an unreacted gas stream and recycling the unreacted gas stream to stage (a);
(d) evaporating at least part of the separated liquid ammonia stream as refrigerant in stage (b) by reducing the pressure of the separated liquid ammonia; and
(e) recovering a gaseous ammonia product stream; the improvement whereby the gaseous ammonia product stream is provided at, or above atmospheric pressure which comprises
   (i) carrying out stages (a) to (c) at a pressure in the range 25 to 120 bar abs.;
   (ii) in stage (d) reducing said pressure of said liquid ammonia to a pressure in the range 1 to 10 bar abs.;
   (iii) carrying out the heat exchange of stage (b) such that:
      after the heat exchange with air or water at ambient temperature, the resultant partly cooled gas stream is weak in, or free of liquid ammonia; and
      the cold stream produced by indirect heat exchange of the partly cooled gas stream with refrigerant:
         contains liquid ammonia and cold unreacted gas containing at least 2% by volume of gaseous ammonia, and
         wherein said cold stream has a temperature that is in the range plus 25 to minus 33° C. and wherein said temperature in the range plus 25 to minus 33° C. is the temperature at which the separation stage (c) is performed;
   said indirect heat exchange with refrigerant being conducted:
   (iiia) by heat exchanging the said partly cooled gas stream counter-currently with:
      (a) the cold unreacted gas stream resulting from the separtion of liquid ammonia from said cold gas stream, and
      (b) a stream consisting of said liquid ammonia undergoing the evaporation of stage (d) and the gaseous ammonia at said pressure in the range 1 to 10 bar abs. produced by said evaporation; and
   (iiib) with a heat exchange surface area sufficient that: the cold-end temperature approach is less than 8° C., and the hot-end temperature approach is less than 5° C.

2. A process according to claim 1 in which the pressure in stages (a) to (c) is in the range 60 to 100 bar abs. when an iron ammonia synthesis catalyst is used, or is in the range 25 to 60 bar abs. when a ruthenium ammonia synthesis catalyst is used.

3. A process according to claim 1 in which the ammonia content of the unreacted gas stream is in the range 4 to 8% v/v.

4. A process according to claim 1 in which the ammonia separation temperature is in the range plus 10° to minus 15° C. and the ammonia gas delivery pressure is in the range 2 to 7 bar abs.

5. A process according to claim 4 which comprises dividing the liquid ammonia into two portions, letting down the first portion to a pressure in the range 4 to 7 bar abs., letting down the second portion to a pressure in the range 2 to 4 bar abs. and heat exchanging the partly cooled reacted synthesis gas stream successively with evaporating liquid ammonia of the said first and second portions, whereby to cool the said gas stream to successively lower temperatures corresponding to the pressures at which evaporation takes place.

6. A process according to claim 2 in which the indirect heat exchange with refrigerant is effected by using secondary heat exchangers having a heat exchange surface of at least 2.5 m$^2$ per kg mol per hour of ammonia condensed from reacted synthesis gas and having a cold-end temperature approach of less than 4° C. and a hot-end temperature approach of less than 3° C.

7. A process according to claim 6 in which said secondary-surface heat exchangers are plate-fin heat exchangers fabricated in brazed aluminum.

8. A process for producing ammonia comprising
  (a) at a pressure within the range 25 to 120 bar abs.,
    (i) feeding a nitrogen-hydrogen ammonia synthesis feed gas stream to an ammonia synthesis reactor which contains an ammonia synthesis catalyst and reacting said feed gas stream over said catalyst at conditions effecting partial conversion to ammonia, thereby forming a reacted synthesis gas stream containing ammonia and unreacted gas,
    (ii) cooling the reacted synthesis gas stream by indirect heat exchange with said synthesis feed gas stream, followed by air or water at ambient temperature, thereby producing a partly cooled reacted synthesis gas stream that is weak in, or free of, liquid ammonia,
    (iii) further cooling the partly cooled reacted synthesis gas stream to a temperature that is below the dew point of ammonia and that is in the range plus 25° to minus 33° C., thereby forming a stream containing a mixture of condensed liquid ammonia, and unreacted gas containing at least 2% by volume of gaseous ammonia,
    (iv) separating, at said temperature within the range plus 25° to minus 33° C., said mixture into a condensed liquid ammonia stream and a stream of said unreacted gas,
    (v) recycling said unreacted gas stream as part of said feed gas stream, and
  (b) letting down the pressure of at least part of the separated condensed liquid ammonia stream to a pressure in the range 1 to 10 bar abs. so as to evaporate the latter to produce a gaseous ammonia product stream at said pressure in the range 1 to 10 bar abs., said further cooling of the partly cooled reacted synthesis gas stream being effected by indirect heat exchange of said partly cooled reacted synthesis gas stream counter-currently with coolants using:
    (i) a heat exchange surface area sufficient that:
      the cold-end temperature approach is less than 8° C., and
      the hot-end temperature approach is less than 5° C. and;
    (ii) as coolants:
      said unreacted gas stream prior to recycle thereof, and
      the liquid ammonia undergoing evaporation and the gaseous ammonia produced by said evaporation.

* * * * *